UNITED STATES PATENT OFFICE.

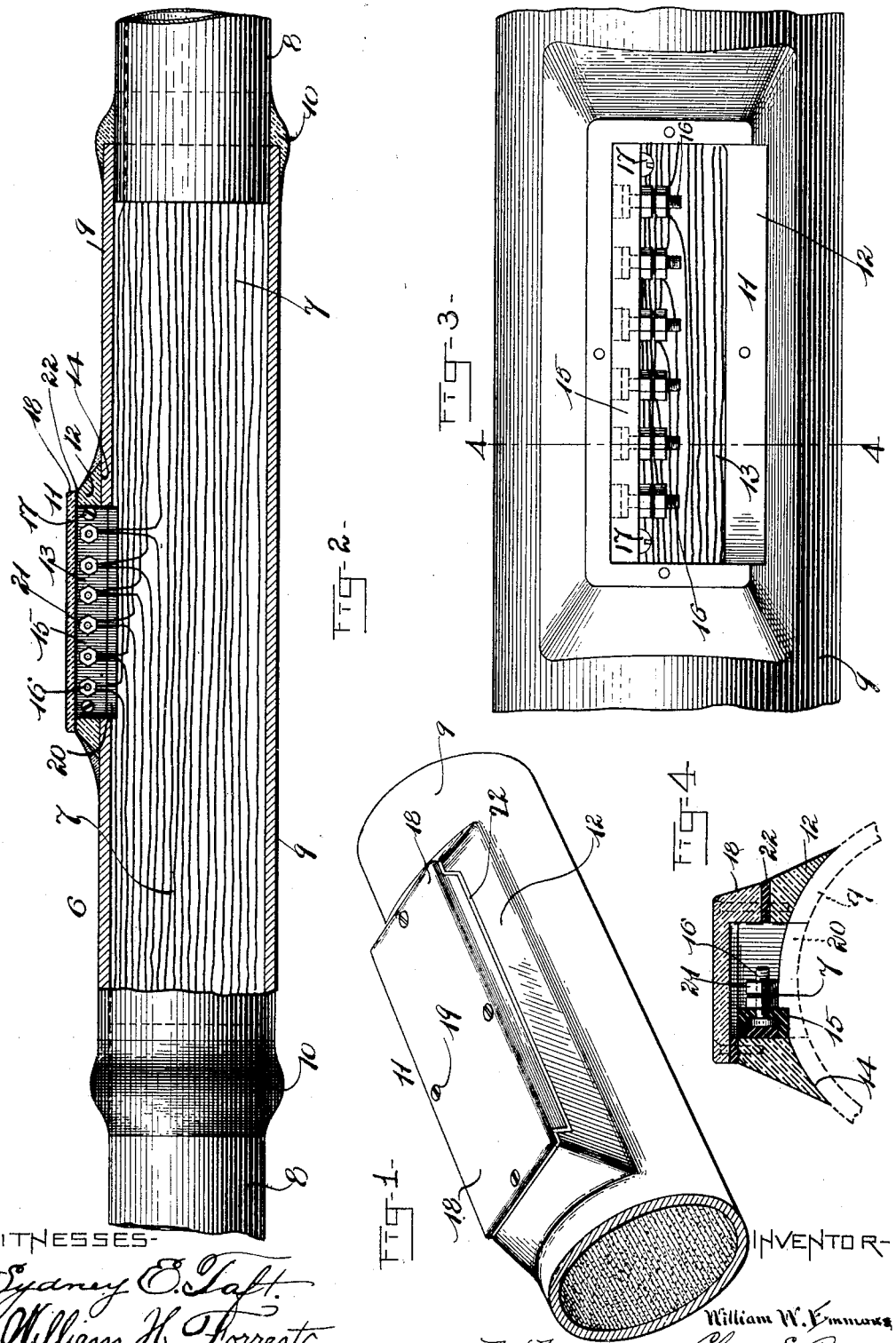

WILLIAM W. EMMONS, OF BOSTON, MASSACHUSETTS, ASSIGNOR TO CHARLES S. GOODING, OF BROOKLINE, MASSACHUSETTS.

TEST-CUP.

SPECIFICATION forming part of Letters Patent No. 702,362, dated June 10, 1902.

Application filed November 6, 1901. Serial No. 81,313. (No model.)

*To all whom it may concern:*

Be it known that I, WILLIAM W. EMMONS, a citizen of the United States, residing at Boston, in the county of Suffolk and State of Massachusetts, have invented new and useful Improvements in Test-Cups, of which the following is a specification.

The object of this invention is to provide a simple, convenient, and inexpensive means whereby different wires of a cable may be reached and tested in order to locate a break or bad place in said cable without disturbing or cutting apart the lead covering of said cable.
It is well known to those skilled in the art that the present manner of locating a break or bad place in a cable is exceedingly difficult and necessitates the expenditure of a large amount of labor and time, consisting, as it does, in removing the sleeve joining the spliced ends of two portions of a cable and after testing the wires and locating the break in the cable restoring said cable to its original condition by soldering said sleeve to the cable by means of a wiped joint at each end of said sleeve.

My invention is applicable to any metal-armored cable such as are commonly used for telephone and telegraph cables.
The invention consists in a test-cup for armored cables, comprising a plate adapted to be attached to a cable, said plate being provided with a chamber and a cover detachably attached to said plate.
The invention further consists of a test-cup for ordinary armored cables, as hereinbefore set forth, provided with means contained within said chamber for connecting the free ends of two wires to each other.
The invention further consists in the combination of an armored cable, which consists of strands of wire inclosed in a lead covering, said covering having an opening in the periphery thereof and a test-cup fast to said covering and inclosing said opening.

The invention further consists in the combination and arrangement of parts set forth in the following specification and particularly pointed out in the claims thereof.
Referring to the drawings, Figure 1 is a perspective view of my improved test-cup, illustrating the same attached to a portion of an armored cable. Fig. 2 is a longitudinal section, partly in elevation, of an armored cable with my improved test-cup attached thereto.
Fig. 3 is a plan view of a portion of an armored cable with my improved test-cup attached thereto, the cover of said test-cup being removed. Fig. 4 is a transverse section of the same, taken on line 4 4 of Fig. 3, looking toward the right in said figure, the cover of the test-cup being shown attached thereto and a portion of the cable being indicated in dotted lines.

Like numerals refer to like parts throughout the several views of the drawings.

In the drawings, 6 represents a portion of an armored cable, showing the same at the portion thereof where the ends of two sections of said cable are joined by splicing.
7 7 indicate the different strands of wire composing the cable, and 8 8 the lead covering thereof.

9 is a lead sleeve used to join the two ends 8 8 of the lead covering of two sections of the armored cable, said sleeve being joined to the covering 8 at each end thereof by an air and water tight joint 10, formed of solder wiped thereon. The sleeve 9 when thus joined to the two ends of the section of cable, and especially to the lead covering 8 8 thereof, constitutes, in effect, a portion of the said lead covering.

My improved test-cup 11 is preferably applied to the cable about midway of the sleeve 9 at the point where the two ends of different sections of the cable are spliced together and consists of a metal plate 12, having a chamber 13 extending therethrough, the under face 14 of said plate being curved to fit the periphery of the lead sleeve 9 and soldered or brazed thereto, as seen in Figs. 1 and 4.
Upon one of the walls of the chamber 13 and extending longitudinally thereof is a hard-rubber insulating-strip 15, to which are attached several posts 16. The insulating-strip 15 is fastened to the plate 12 by screws 17. A cover 18 extends over the entire chamber 13 and is fastened to the plate 12 by screws 19.
Between the cover 18 and plate 12 is a rubber gasket 22, which forms a water-tight joint between said cover and plate, sealing the chamber 13 from the outer air and moisture.

An oblong opening 20 is provided in the periphery of the lead sleeve 9 of substantially the shape and size of the chamber 13, and through this opening the free ends of different wires in each of the two adjoining sections of the armored cable are carried into the chamber 13, one end of each of two separate wires being joined together by turning them around one of the screw-posts 16 and locking them in position thereon by means of the nuts 21 in a manner well known to those skilled in the art. After a sufficient number of wires have been connected, as hereinbefore set forth, the cover 18 is fastened to the plate 12 by means of the screws 19, the rubber gasket 22 being introduced between said plate and cover to form an air and water tight joint. It will be seen that after having connected the wires as shown and described and having placed the cover upon the plate and fastened it thereto the cable will be free from any air or moisture entering through the chamber 13 and opening 20 and that if it is desired to find a break at one side or the other of the sleeve 9 all that will be necessary will be to remove the cover 18 and test the cable by means of the different wires attached to the posts, and when the location of the break has been found the cover can be attached to the plate very quickly, as hereinbefore set forth.

This device saves a great amount of time and labor, as previously it has been necessary to remove the wiped soldered joint 10 at each end of the sleeve 9 and remove the sleeve itself in order to reach the wires in the cable and test for a break therein and after locating the break to replace the sleeve and wipe a joint at each end thereof, the whole job having to be done very carefully in order that no moisture or air may reach the cable through the joints thereof. By my improved device, as hereinbefore described and set forth, all this trouble and expense are obviated.

Having thus described my invention, what I claim, and desire by Letters Patent to secure, is—

1. As an article of manufacture, a test-cup for cables, comprising a plate adapted to be attached to a cable, provided with a chamber, and a cover detachably attached to said plate.

2. As an article of manufacture, a test-cup for cables comprising a plate adapted to be attached to a cable, provided with a chamber extending therethrough, and a cover detachably attached to said plate and closing said chamber on one side thereof.

3. As an article of manufacture, a test-cup for cables comprising a plate adapted to be attached to a cable, provided with a chamber, a cover detachably attached to said plate, and a packing introduced between said cover and plate.

4. As an article of manufacture, a test-cup for cables comprising a plate adapted to be attached to a cable, provided with a chamber, a cover detachably attached to said plate and means contained within said chamber for connecting the free ends of two wires to each other.

5. As an article of manufacture, a test-cup for cables comprising a plate adapted to be attached to a cable, provided with a chamber, a cover detachably attached to said plate, and means contained within said chamber and insulated from said test-cup for connecting the free ends of two wires to each other.

6. In combination, a cable consisting of strands of wire inclosed in a lead covering, said covering having an opening in the periphery thereof and a test-cup fast to said covering and inclosing said opening.

7. In combination, a cable consisting of strands of wire inclosed in a lead covering, and a test-cup comprising a plate fast to said covering, provided with a chamber, and a cover detachably attached to said plate.

8. In combination, a cable consisting of strands of wire inclosed in a lead covering, a test-cup comprising a plate fast to said covering, provided with a chamber extending therethrough, and a cover detachably attached to said plate and closing said chamber on one side thereof.

9. In combination, a cable consisting of strands of wire inclosed in a lead covering, a test-cup comprising a plate fast to said covering, provided with a chamber, a cover detachably attached to said plate, and means contained within said chamber for connecting the free ends of two wires leading from said cable to each other.

In testimony whereof I have hereunto set my hand in presence of two subscribing witnesses.

WILLIAM W. EMMONS.

Witnesses:
CHARLES S. GOODING,
WILLIAM H. FORREST.